Figure 1:
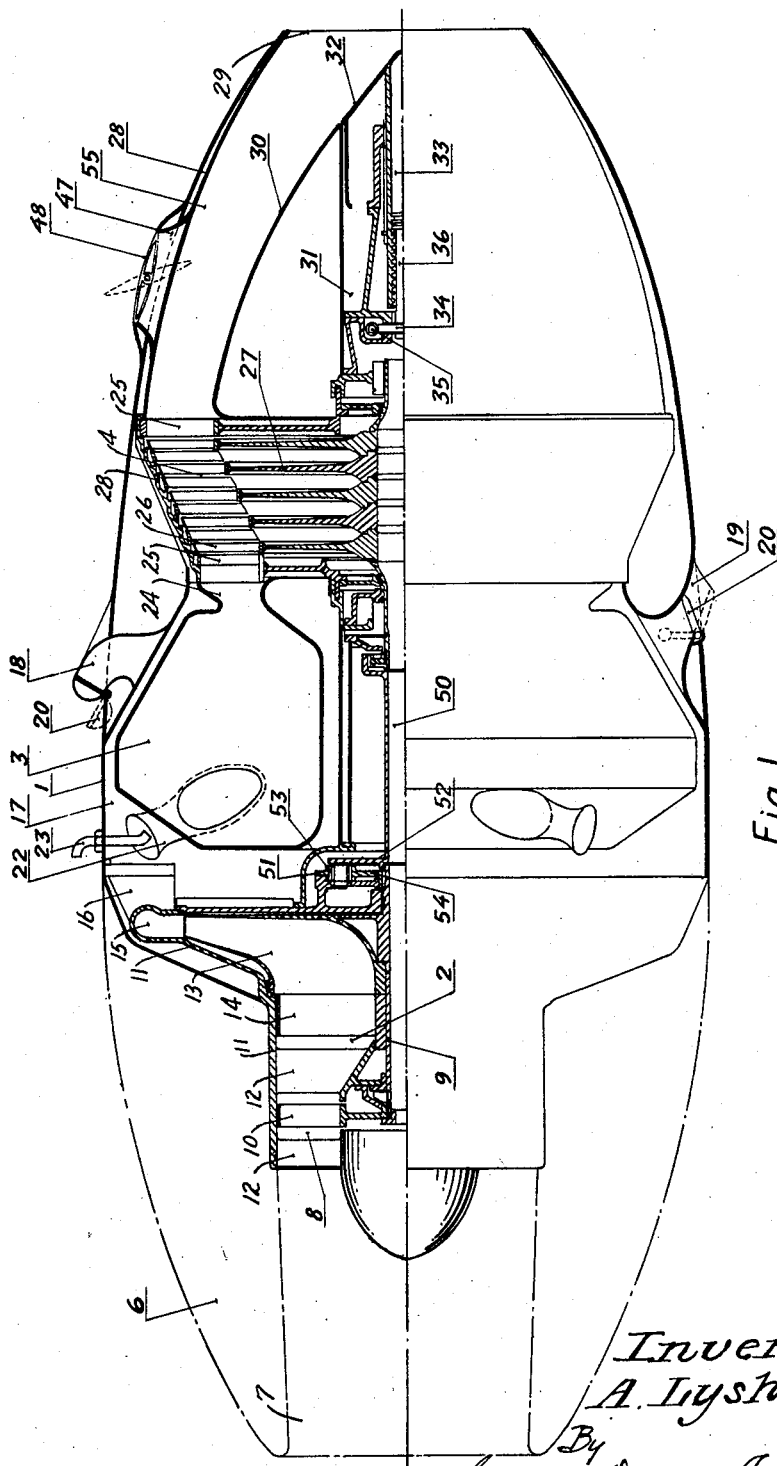

Dec. 9, 1952  A. LYSHOLM  2,620,626
GAS TURBINE PROPULSION UNIT FOR AIRCRAFT
Filed Oct. 5, 1945  4 Sheets-Sheet 1

Inventor
A. Lysholm
By
Glascock Downing ...
Attys.

Dec. 9, 1952 A. LYSHOLM 2,620,626
GAS TURBINE PROPULSION UNIT FOR AIRCRAFT
Filed Oct. 5, 1945 4 Sheets-Sheet 2

Inventor
A. Lysholm

Dec. 9, 1952  A. LYSHOLM  2,620,626
GAS TURBINE PROPULSION UNIT FOR AIRCRAFT
Filed Oct. 5, 1945  4 Sheets-Sheet 3

Inventor
A. LYSHOLM
By Cushman, Darby & Cushman
Attorneys

Dec. 9, 1952     A. LYSHOLM     2,620,626
GAS TURBINE PROPULSION UNIT FOR AIRCRAFT

Filed Oct. 5, 1945     4 Sheets-Sheet 4

Inventor
A. Lysholm
By Glaswick Downing Luke
Attys.

UNITED STATES PATENT OFFICE 2,620,626

GAS TURBINE PROPULSION UNIT FOR AIRCRAFT

Alf Lysholm, Stockholm, Sweden

Application October 5, 1945, Serial No. 620,540
In Sweden September 1, 1944

Section 1, Public Law 690, August 8, 1946
Patent expires September 1, 1964

2 Claims. (Cl. 60—39.2)

The present invention relates to at least partly with reaction operating prime movers for aeroplanes or the like, which constitute a propulsion unit or assembly, and include a gas turbine which drives an air compressor for compressing air to be supplied into a combustion chamber (or an internal combustion engine serving as a source of gas under pressure), in which combustion chamber combustion gases are produced for driving the gas turbine, the gases being exhausted from the turbine through one or more rearwardly directed outlets.

In the control of the output of the gas propulsion unit of the type indicated above it is to be distinguished between partial load control in which greatest possible economy is pursued, and control for the starting and for stand by, due to the short period during which such control is required, the efficiency of the plant may be neglected to a certain extent, while laying more stress upon rapidity and perfect function of the control.

The partial load control was hitherto generally limited to the variation of the injected fuel quantity only. Such method of control has, however, certain disadvantages. In continuous operation, that is at partial load control, it is desired to have the turbine operate at a gas temperature considerably lower than the temperature prevailing during the comparatively short periods in which it is desired to utilize the maximum output of the unit assembly. At such a temperature the mechanical strength of the material of the turbine blades is reduced and, consequently, there is the risk of the stresses occurring during long operation at this temperature exceeding allowable values. If the quantity of fuel injected is reduced, the speed of the turbine and the air quantity supplied by the compressor will be reduced such that the ratio between fuel and air in the combustion chamber will substantially be the same as at full load. Consequently, the temperature in the combustion chamber will not be reduced in spite of the reduced injection of fuel, but will be maintained at a value unsuitably high for continuous operation. As a result thereof there will be the risk the material will be overstressed, as stated above. On account thereof, the turbine must be designed with an increased factor of safety.

Methods previously used include certain disadvantages which mainly arise from the characteristic of the dynamic or turbo compressors used in driving units or aggregates of the kind in consideration. As a matter of fact, in the range of flow below a certain volume of air drawn in per unit of time, that is below the critical volume, compressors of this type start to surge or "pump," that is the pressure suddenly falls and the flow begins to pulsate. A further inconvenience in the stand-by control by varying the outlet areas for the combustion gases according to known methods, consists in that all of the air quantity supplied at full compressor speed is passed through the combustion chamber with the result that the combustion temperature will be reduced too much.

The present invention has for its object to provide means for avoiding pumping of the compressor and for controlling both the temperature in the combustion chamber and the resulting propulsion force, in order to eliminate the above named inconveniences. In contrast to previously known propulsion units, there are provided one or more air bleeds for controlling the operating conditions of the propulsion unit. The air bleeds may be arranged in a manner such that the bled air can be controlled both to its quantity and direction of flow. To this end, the unit may be provided with a plurality of openings including control and shut-off means, one or more of said openings being forwardly and one or more openings being rearwardly directed.

By adjusting the quantity of the bled air, only the quantity of air required to maintain the temperature at the desired value will pass through the combustion chamber. The excess of air, if any, supplied by the compressor which at all speeds will operate with its maximum efficiency, is bled through the outlet openings. The resultant propulsion force can be controlled by alternately opening the forwardly and backwardly directed discharge openings, the air blown out counteracting or increasing the propulsion force of the aggregate.

If the turbine is combined with a multistage compressor, air bleeds may be provided between the stages of the compressor.

The gas turbine propulsion unit according to the invention may advantageously be combined with control means of known type such as bleeds for combustion gases and means for varying the cross-sectional area of the outlet nozzle. The unit may also be provided with control means common to several or all of the control arrangements.

The means for controlling the output of the unit may be combined with a device which at rapid adjustment of the control means towards increased output effects a temporary increase of the area of the outlet nozzle beyond the value required for the new position of the control means.

The design and method of operation and the advantages obtained by the invention will be described more in detail with reference to the accompanying drawings.

Figure 2:
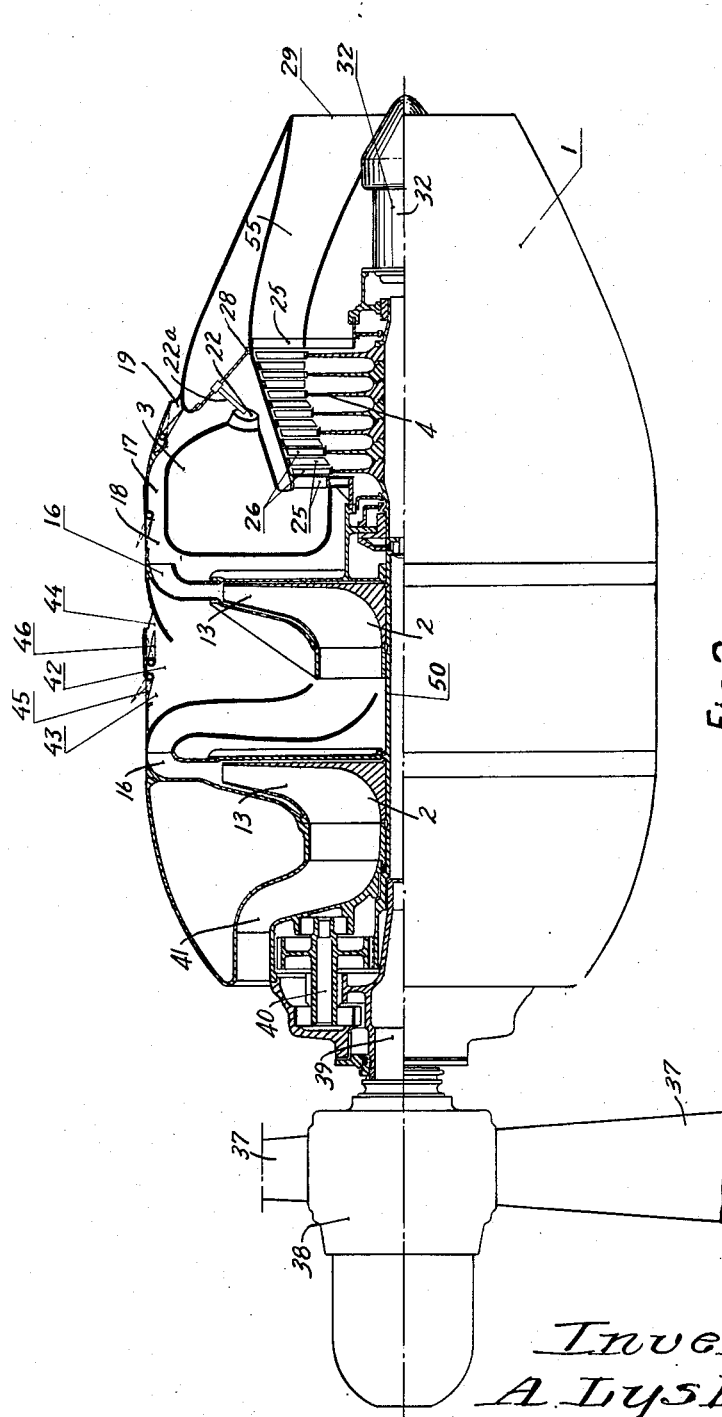
Figure 3:
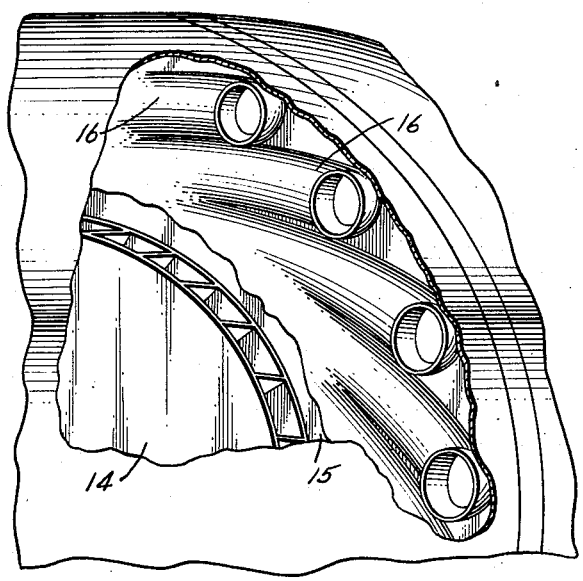
Figure 8:
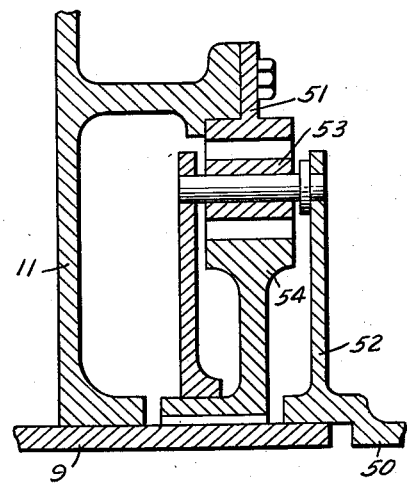
Figure 9:
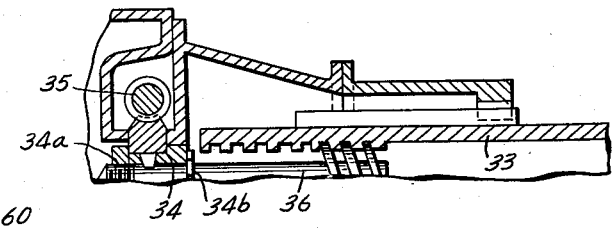
Figure 4:
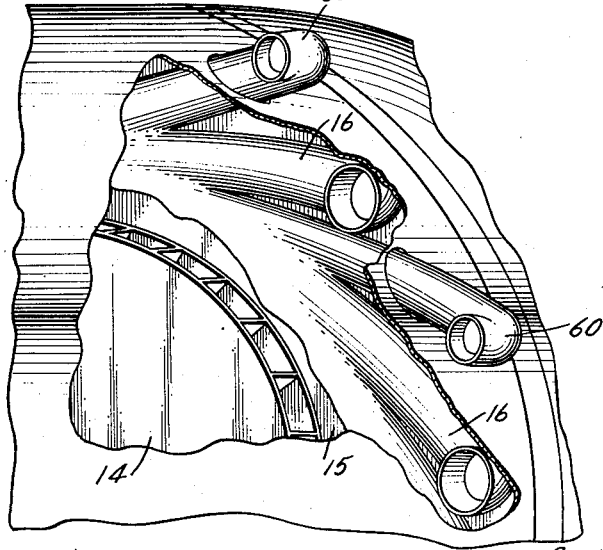
Figure 5:
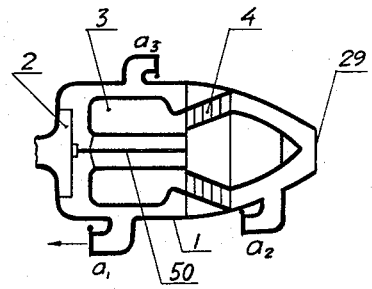
Figure 7:
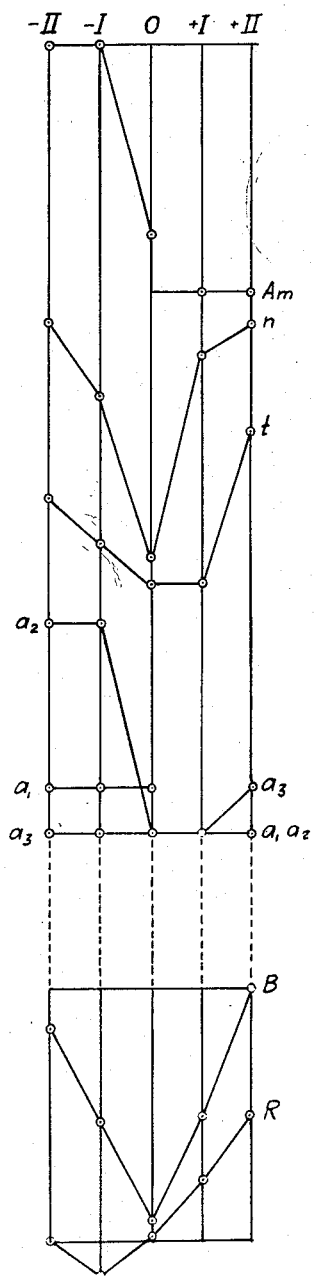
Figure 6:
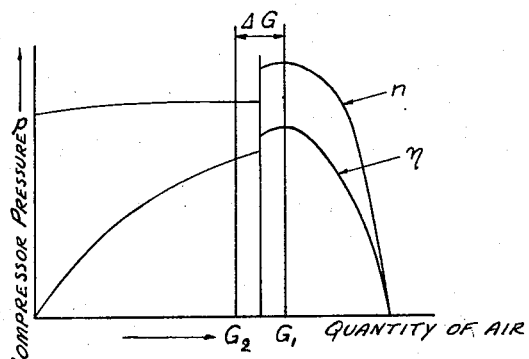

Fig. 1 is a longitudinal section of a gas turbine propulsion unit operating with reaction only and provided with a combined axial and radial flow compressor. Fig. 2 shows an assembly for combined propulsion by reaction and by means of a propeller and including a two-stage compressor with means for bleeding air also from between the stages of the compressor. Figs. 3 and 4 are perspective views, partly in section, of two different embodiments of air passages connected to the diffuser of a compressor. Fig. 5 is a diagrammatic view of a unit with means for exhausting air and combustion gases. Fig. 6 shows a diagram which illustrates the influence of the air bleed upon the operation of the compressor. Fig. 7 shows a diagram which illustrates the relationship between the operation of the unit and the various controlling means shown in Fig. 5. Figure 8 is a detail sectional view of the gear mechanism associated with the impeller casing, and Figure 9 is a detail sectional view of the controlling device mounted in the turbine casing.

In the drawings, the propulsion unit or assembly includes a casing 1 which surrounds one or more compressors 2, a combustion chamber 3, a gas turbine 4, controlling means and auxiliaries or the like not shown. The forward portion of the casing is of a streamline shape. According to the embodiment shown in Fig. 1, the space 6 between the outer wall of the casing and a cylindrical passage 7 extending from the forward portion of the casing and arranged concentrically with respect to the longitudinal axis of the casing, is adapted to receive said auxiliaries not shown. The passage 7 communicates with the inlet opening of an air compressor 8 of the axial flow type including an impeller wheel 10 mounted on a rotatable sleeve 9 and a casing 11 having fixed guide vanes 12.

Within the casing 11, there is also provided a centrifugal compressor 13 having an inlet wheel 14 and a diffuser 15. The rear wall of the casing 11 is provided with an annulus 51 having internal gear teeth and cooperating with a number of planetary gear wheels 53 rotatably mounted on a carrier 52 which is secured to the shaft 50. The gear wheels 53 are always in engagement with a sun wheel 54 fixed on the sleeve 9. The planetary gearing 51—54 has for its purpose to increase the number of revolutions of the shaft 50. This is necessary because of the fact that in the embodiment shown in Fig. 1 the pressure and temperature conditions of the turbine are such that the number of revolutions of the turbine is lower than that suitable for the compressor.

According to the embodiment shown in Fig. 1, tangentially directed diffuser passages 16 (see also Fig. 3) are connected to the diffuser of the last compressor stage, said passages 16 being smoothly curved backwards. They are arranged to supply the air compressed into a space or air compartment 17 between the casing 1 and the combustion chamber 3 and which surrounds the combustion chamber. The compartment 17 is provided with substantially forwardly and rearwardly directed openings 18 and 19, respectively. These openings can be partly or entirely closed such as by means of flaps 20. In addition thereto, openings may be provided in the form of outlet passages 60 (Fig. 4) which are located between the passages 16 and which connect the diffuser of the compressor or of a compressor stage directly to the atmosphere.

The combustion chamber 3 is provided with inlet nozzles 22 for the air under pressure supplied through the passages 16. According to the embodiment shown in Fig. 1, the nozzles 22 are located in the wall of the combustion chamber with their inlets adjacent the outlets of the passages 16, open spaces being provided between the passages 16 and the nozzles 22. By means of nozzles 23, the fuel required for the operation of the unit is injected into the combustion chamber 3.

The combustion chamber 3 is devised as a ring surrounding the shaft 50. As shown in Fig. 2, it may also partly surround the turbine. At the rear end of the combustion chamber, there is provided an annular opening 24. Immediately behind said opening, there is located the first guide vane ring 25 of the turbine. The turbine consists in the usual manner of moving blades 26 and guide vanes 25. The moving blades are mounted on wheels 27 which are connected to the rotatable shaft 50. The guide vanes are mounted in the turbine casing 28. The turbine casing is rearwardly elongated beyond the turbine, the elongated portion having a streamline shape and a circular outlet nozzle 29.

A substantially streamlined hollow body 30 having a central cylindrical part 31 is provided within the rear portion of the casing 28 and constitutes together with said casing an annular passage 55 for the exhaust gases of the turbine. The circular outlet nozzle 29 of the turbine casing 28 can be partly shut-off by means of a controlling device provided in the passage 31. According to the embodiment shown in Fig. 1, this controlling device comprises a cone 32 telescopically mounted in the tube 31. The rear end of said tube, that is the end directed towards the outlet nozzle, is closed and conically shaped in a manner such that it constitutes an elongation of the body 30 when the cone 32 is entirely moved into the tube 31. The cone 32 is connected with an inner smaller tube 33 provided with internal threads and threaded upon a screw 36, the forward end of which is provided with a worm wheel 34. This worm wheel is rotatable by means of an externally operable screw 35, the screw 36 following the rotation thereof so as to displace the tubes 32 and 33 which are prevented from rotation. In its outward position, the cone 32 shuts off part of the area of the outlet nozzle, which in this manner can be varied within certain limits by the device described.

The casing 28 may further be provided with openings 47 which may be closed by means of flaps 48. Through said openings, exhaust gases may be blown out, for instance when the aeroplane is to be started or landed (Fig. 1).

The arrangement shown in Fig. 2 includes a multi-stage compressor 2 and substantially distinguishes from the embodiment described above by the fact that it is provided with a propeller 37 and is thus adapted for combined propulsion. The propeller 37 is by means of a hub 38 mounted on a short shaft 39 arranged in alignment with the shaft 50. The said shafts are connected to each other by means of a toothed gearing 40 for reducing the speed of the propeller. Considering the efficiency of the propeller as well as other factors, the speed of the propeller should be lower than that of the compressor. Thus, the gearing is located between the compressor and the propeller. It should be noted that in this case no gearing is required between the turbine and the compressor. Due to the increased pressure and a lower temperature the space of the turbine according to Fig. 2 can be increased to such a degree that the compressor can be directly driven by the turbine shaft. The turbine according to Fig. 2 will thus be smaller than the turbine according to Fig. 1. As shown in Fig. 2, the combustion chamber can be located outside the turbine so as to envelop the same. In this case, the air inlet nozzles 22 may be provided at the rear of the combustion chamber, which communicates with fuel nozzles 22a. The air inlet opening of the compressor is devised as an open annular passage 41 which surrounds the gearing 40.

The space 42 between the compressor stages is provided with additional air outlet openings 43 and 44 which are provided with flaps 45 and 46, respectively, for varying the outlet areas. These openings and control flaps are arranged in a manner such that the air is exhausted in certain directions substantially in the forward and backward direction, respectively. According to Fig. 2, the flow of air from the openings 43 between the compressor stages and from the openings 18 in the space 17 are directed forwardly, whereas the flow of air from the openings 19 and 44 is directed backwardly.

In Fig. 5 an embodiment is diagrammatically shown which substantially corresponds to the embodiment illustrated in Fig. 1 and which, moreover, is provided with an opening $a_2$ for exhausting gases in the forward direction. $a_1$ indicates the openings for exhausting air in the forward direction, while $a_3$ indicates the openings for exhausting air in the backward direction.

The assembly according to the invention operates in the following manner. At full load, when it is desired to have a temperature as high as possible in the combustion chamber 3 so as to obtain the maximum output of the aggregate, a certain controllable quantity of air is normally bled, said quantity being such that the compressor 2 will operate at its maximum efficiency. Due to the air bled, the amount of air passing through the combustion chamber is reduced, and the temperature can be maintained at a desired high value without decreasing the efficiency of the compressor. The remainder of the air is exhausted through rearwardly directed outlet openings and thereby produces as reactive force which contributes to the propulsion. At a change of the output, for instance down to a value corresponding to cruising speed of the air craft, the injected fuel quantity is reduced with the result that the speed of the turbine and the compressor will likewise be reduced. Consequently, the compressor will produce a reduced quantity of air per unit of time. If now the area of the air bled openings were maintained constant, the temperature in the combustion chamber would not noticeably be reduced, as stated above, since the quantity of air to be heated would still amount to substantially the same proportion as previously in comparison with the injected fuel quantity. In accordance with the invention, the desired lower temperature is obtained by a reduction of the area of the bled holes. Due to this reduction, an air quantity increased relatively to the fuel quantity will pass through the combustion chamber. Consequently, the temperature in the combustion chamber will be reduced to a suitable value.

The diagram shown in Fig. 6 illustrates the influence of the air bled upon the operation of a compressor in an aggregate according to the invention. In the diagram, the abscissae represent quantity of air, while the ordinates represent pressure of the compressor. The curve $n$ indicates the relationship between the pressure and the quantity of air at a certain number of revolutions. The curve indicated as $\eta$ illustrates the variations of the efficiency corresponding to curve $n$.

At normal average speed corresponding to the number of revolutions indicated by the curve $n$, it can be assumed that the compressor operates with its maximum efficiency and supplies the total air quantity $G_1$ to the combustion chamber and the turbine. In this case, a great amount of excess air is used in the combustion chamber with the result that the temperature of the combustion gases will be comparatively low. If the fuel quantity is increased to a value corresponding to full load, the temperature will be considerably increased. In addition thereto, the speed will be increased to some extent, such increase being however, not taken into consideration in the diagram. Due to the large increase of the temperature, the quantity of air passing through the combustion chamber will be reduced to the value indicated at $G_2$. As will be seen from the diagram, the compressor will operate within the pumping range. In order to avoid this risk and to have the compressor operate with its maximum efficiency, the quantity of air indicated at $\Delta G$ must be bled.

In operation, it is advantageous to have the aggregate at partial load operate at a lower number of revolutions than at full load. This will, however, not change the principles of the above consideration.

If the above named variations of the fuel quantity are effected comparatively slowly, the compressor can be controlled merely by bleeding air so as to eliminate the risk of pumping. At a very rapid increase of the quantity of fuel, in order to obtain a rapid acceleration of the aggregate, the output of the turbine will not have time to be increased at the desired rate. In this case, the output may be increased by reducing the backpressure at the same time, which may be effected by a temporary increase of the area of the outlet nozzle for the combustion gases.

If it is desired to maintain the aggregate in running order for start or landing, the speed should be maintained at a high value, and at the same time, the propulsion force should be small. To this end, the surplus air is bled through the forwardly directed openings 18 and 43 so as to obtain a reactive force which counteracts the propulsion force. At the same time, the area of the outlet nozzle 29 may be increased so as to reduce the velocity of the gases producing the propulsion force and, consequently, also the reactive force. Especially by means of the combination of devices for blowing out air and combustion gases mentioned above in conjunction with the description of Fig. 5, a backwardly directed force can be obtained which entirely eliminates the propulsion force or even surmounts the propulsion force, even at maximum speed of the turbine and compressor. Immediately before the start of the aeroplane, the temperature of the aggregate is augmented by increased injection of fuel. At the start, the forwardly directed openings for bleeding are closed, whereas the backwardly directed openings are opened. At the same time, the area of the outlet nozzle should be reduced to the value which corresponds to full load.

Fig. 7 illustrates diagrammatically the number of revolutions $n$, the temperature $t$ and the resulting reaction force R as functions of different adjustments of the areas of the outlet openings $a_1$, $a_2$, $a_3$, of the area $A_m$ of the outlet nozzle 29 according to Fig. 5 and of the injected fuel quantity B. In the diagram, the vertical lines —II and —I indicate two different stand-by positions of the control devices, 0 indicates warming up or idling position, whereas +I and +II indicate half load and full load, respectively.

As will be seen from the diagram, the injected fuel quantity is very small in the idling position, and the outlet opening $a_1$ for the combustion air can be assumed to be entirely open, whereas the gas outlet opening $a_2$ and the air outlet opening $a_3$ are closed. The area $A_m$ of the outlet nozzle 29 is adjusted to a value which may be somewhat higher than the value corresponding to normal operation.

By the adjustments of the fuel quantity and the various areas indicated above, a comparatively low temperature and low speed is obtained, and the resulting propulsion force will be directed forwardly, although very small.

At half load corresponding to the vertical line +I, the quantity of fuel is increased and the area of the outlet nozzle $A_m$ is adjusted to its normal value, whereas all of the outlet openings $a_1$, $a_2$ and $a_3$ are entirely closed. As will be seen, the temperature is, in this case, substantially equal to the temperature at idling, whereas the number of revolutions has been considerably increased. The resulting propulsive force is also materially increased.

Upon further increase of the injected fuel quantity to the maximum value corresponding to the vertical line +II and with entirely open air outlet opening $a_3$, a considerable increase of the temperature and a minor increase of the number of revolutions are obtained with normal area $A_m$ of the outlet nozzle. The resultant forwardly directed propulsion force has now obtained its maximum value.

If it is desired to change the aggregate from idling condition into a stand-by condition, in accordance with the vertical line —I, the fuel quantity and the areas $a_2$ and $A_m$ must be increased so as to obtain a slight increase of the temperature and a comparatively great increase of the speed of the propulsion unit. The resulting propulsive force will be comparatively great and directed backwardly.

At unaltered adjustment of all of the outlet areas and upon further increase of the fuel quantity, the temperature will be further increased and the number of revolutions will amount substantially to the same value as at full load. This operating condition is represented by the vertical line —II. As will be seen from the diagram, the resulting propulsion force is no longer directed backwardly, but has become substantially zero.

The operating conditions shown in the diagram only serve to explain the influence of the variations of the areas of the various outlet openings. As will be apparent from the diagram, the aggregate may be operated at half load at substantially the same low temperature as during idling. On the other hand, the speed at half load is slightly lower than at full load, and it is consequently possible to shift over rapidly from half to full load or vice versa. In the stand-by position according to line —II, in which the resulting propulsion force is substantially zero, the aggregate can be rapidly shifted over to full load merely by closing the outlet openings $a_1$ and $a_2$, throttling the outlet nozzle $A_m$ and opening the air outlet $a_3$. In the diagram, there is also shown a slight increase of the fuel quantity. The number of revolutions remains substantially constant. Consequently, the increase of the output can be effected without any time lag due to the inertia of the aggregate.

It will be further seen from the diagram that the various control devices for the outlet openings and the fuel controlling devices may advantageously be connected to a common operating member, such as an operating lever, which may be devised so as to assume various positions corresponding to the vertical lines —II, —I, 0, +I, +II. It is desirable that all adjustments should be effected automatically merely by the movement of the common operating lever, which is of great importance from the point of view of attendance. As will appear from the above, the invention provides the possibility of controlling the aggregate under all operating conditions in a manner such as to ensure reliable and economical operation.

The improvement according to the invention also results in a further considerable advantage. The output required for starting the aggregate will be very low and, in certain cases, amount to a fraction only of the output required in similar aggregates lacking means for bleeding air. Due to the air bled, the temperature can be maintained at a higher value than in known aggregates with the result that the output of the turbine will already at a low number of revolutions become sufficient to drive the compressor.

It will be obvious that the design of the various details of the aggregate may differ from the embodiment described and illustrated without departing from the scope of the invention. The invention also includes various combinations of the controlling devices described.

What I claim is:

1. A propulsion unit for aircraft including a casing having a gas turbine, a combustion chamber, and an air compressor therein; means operatively connecting said gas turbine to said compressor, said compressor having circumferentially spaced diffuser passages extending tangentially therefrom and communicating with said air compartment for discharging compressed air into the same, means between the diffuser passages for communicating the latter directly with the atmosphere, said combustion chamber having air inlet means communicating with said air compartment, said casing adjacent said combustion chamber having air bleed openings, and means for controlling the discharge of air through said bleed openings so as to regulate the quantity of compressed air introduced from said air compartment into the combustion chamber, the parts being constructed and arranged so that only a portion of the compressed air is passed through the combustion chamber.

2. A propulsion unit for aircraft including a casing having a gas turbine, a combustion chamber, and an air compressor therein; means operatively connecting said gas turbine to said compressor, said combustion chamber being spaced from the casing to provide an air compartment, said compressor having diffuser passages communicating wtih said air compartment for discharging compressed air into the same, said combustion chamber having air inlet nozzles extending into said air compartment and spaced from said diffuser passages, means for supplying fuel through said nozzles into the combustion chamber, said casing adjacent said combustion chamber having air bleed openings, and means for controlling the discharge of air through said bleed openings so as to regulate the quantity of compressed air introduced from said air compartment into the combustion chamber, the parts being constructed and arranged so that only a portion of the compressed air is passed through the combustion chamber.

ALF LYSHOLM.

REFERENCES CITED

The following references are of record in the file of this patent:

UNITED STATES PATENTS

| Number | Name | Date |
|---|---|---|
| 1,097,259 | Nusim | May 19, 1914 |
| 2,280,835 | Lysholm | Apr. 28, 1942 |
| 2,341,871 | Karrer | Feb. 15, 1944 |
| 2,356,557 | Anxionnaz et al. | Aug. 22, 1944 |
| 2,380,989 | Nettel et al. | Aug. 7, 1945 |
| 2,399,046 | Larrecq | Apr. 23, 1946 |
| 2,404,324 | Staley | July 16, 1946 |
| 2,405,723 | Way | Aug. 13, 1946 |

FOREIGN PATENTS

| Number | Country | Date |
|---|---|---|
| 513,751 | Great Britain | Oct. 20, 1939 |
| 541,307 | Great Britain | Nov. 21, 1941 |